US009733378B2

(12) United States Patent
Carcaterra et al.

(10) Patent No.: US 9,733,378 B2
(45) Date of Patent: Aug. 15, 2017

(54) SYSTEM FOR GENERATING PRESSURE WAVES IN AN UNDERWATER ENVIRONMENT

(75) Inventors: Antonio Carcaterra, Rome (IT); Davide Calcagni, Cislago (IT); Stefano Carlo Luigi Sandroni, Cassano d'Adda (IT)

(73) Assignee: ENI S.p.A., Rome (IT)

( * ) Notice: Subject to any disclaimer, the term of this patent is extended or adjusted under 35 U.S.C. 154(b) by 1146 days.

(21) Appl. No.: 13/322,021

(22) PCT Filed: May 14, 2010

(86) PCT No.: PCT/EP2010/003048
§ 371 (c)(1),
(2), (4) Date: Jan. 23, 2012

(87) PCT Pub. No.: WO2010/136142
PCT Pub. Date: Dec. 2, 2010

(65) Prior Publication Data
US 2012/0113756 A1 May 10, 2012

(30) Foreign Application Priority Data
May 26, 2009 (IT) ............... MI2009A0929

(51) Int. Cl.
G01V 1/137 (2006.01)
G01V 1/38 (2006.01)
(52) U.S. Cl.
CPC .................. *G01V 1/3843* (2013.01)
(58) Field of Classification Search
CPC .................. G01V 1/137; G10K 9/10
(Continued)

(56) References Cited

U.S. PATENT DOCUMENTS 3,741,333 A * 6/1973 Muniz .................... G01V 1/145
116/137 R
4,153,135 A * 5/1979 Bouyoucos ............ G01V 1/135
181/120
(Continued)

FOREIGN PATENT DOCUMENTS

CN 200977999 Y 11/2007
CN 101303413 A 11/2008

OTHER PUBLICATIONS

International Search Report Issued Jan. 12, 2012 in PCT/EP10/003048 Filed May 14, 2010.
(Continued)

*Primary Examiner* — Luke Ratcliffe
*Assistant Examiner* — Amie M N'Dure
(74) *Attorney, Agent, or Firm* — Oblon, McClelland, Maier & Neustadt, L.L.P.

(57) ABSTRACT

System for generating pressure waves for deep seismic surveys operating in an underwater environment below the surface, suitable for investigating subcrustal objectives for prospecting purposes in the search for hydrocarbons and/or minerals. The system comprises one or more autonomous underwater vehicles organized in swarms, independent and coordinated, each housing one or more autonomous acoustic sea sources with self-propelled striker pistons. This system is served by a system of supporting surface stations, for reprovisioning, recovery actions, checking the well-being of the single vehicles and swarms and maintenance. The system is capable of using both conventional and non-conventional self-charged acoustic sea seismic sources. The system is capable of replicating the effect of a conventional source operated from the surface. The seismic sea source of the non-conventional acoustic type, proposed herein, can release a high-intensity pressure wave produced by a system of two striker pistons, which does not consume air when
(Continued)

Figure 1:
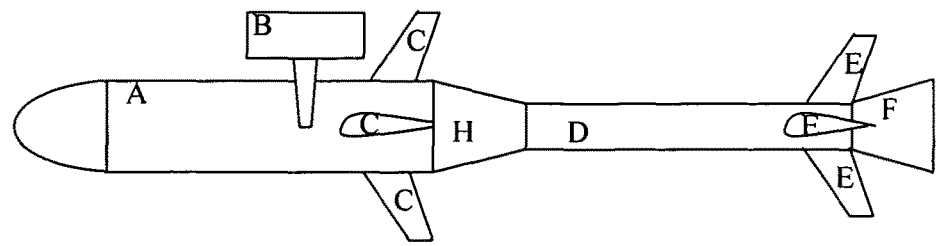

operating as it does not disperse air or another gas in water and does not produce mass variations of the device during its functioning and allows the amplitude and duration of the sound wave emitted and characteristics of the emission spectrum, to be regulated.

11 Claims, 11 Drawing Sheets

(58) Field of Classification Search
USPC .......................................................... 367/144
See application file for complete search history.

(56) References Cited

U.S. PATENT DOCUMENTS

| | | | |
|---|---|---|---|
| 4,577,547 A * | 3/1986 | Jaworski | B25D 11/06 91/39 |
| 4,683,558 A * | 7/1987 | Karner | G01V 1/147 181/111 |
| 4,747,466 A * | 5/1988 | Jaworski | B25D 11/06 181/113 |
| 4,815,557 A * | 3/1989 | Duwe | 181/106 |
| 5,894,450 A * | 4/1999 | Schmidt et al. | 367/134 |
| 6,056,237 A * | 5/2000 | Woodland | B64C 3/40 244/120 |
| 2003/0151974 A1* | 8/2003 | Kutty | G01V 1/3808 367/23 |
| 2003/0167998 A1* | 9/2003 | Huntsman | B63G 8/08 114/312 |
| 2007/0051292 A1* | 3/2007 | Kilbourn | B63B 35/00 114/311 |
| 2007/0186837 A1* | 8/2007 | Bagley | B63G 8/22 114/333 |
| 2008/0009788 A1* | 1/2008 | Hunter | A61M 5/3007 604/68 |
| 2008/0165617 A1* | 7/2008 | Abbot | G01S 11/14 367/3 |
| 2009/0107388 A1* | 4/2009 | Crowell | B63G 8/00 114/336 |

OTHER PUBLICATIONS

Combined Chinese Office Action and Search Report issued Mar. 3, 2016 in Patent Application No. 201410191933.3 (with English language translation).

* cited by examiner $$p \approx \rho \frac{\partial \varphi}{\partial t}$$

SYSTEM FOR GENERATING PRESSURE WAVES IN AN UNDERWATER ENVIRONMENT

FIELD OF THE INVENTION

The present invention relates to a system for generating pressure waves for deep seismic surveys operating in an underwater environment comprising autonomous acoustic sea sources with striker pistons. In particular, it relates to a system assembled on autonomous underwater vehicles which, when navigating in formation and emitting the sources with appropriate synchronization, recreate the specific effect of constructive interference of a conventional air-gun array allowing seismic surveys to be effected in sea environment with automatic functioning, above all in arctic areas or areas difficult to reach, where, for example, the presence of surface ice and/or surged sea prevents the normal navigations of ships.

A conventional seismic sea source (air-gun array) produces pressure waves capable of propagating in water and therefore in the earth's crust through the instantaneous release of air at high pressure. These pressure waves are characterized by amplitudes which can reach 240 dB.

STATE OF THE ART

From the point of view of vehicles, current technologies for seismic surveys in the sea are based on the use of surface ships which entrain both seismic sources and receiver systems suitable for capturing the acoustic signals reflected by geological formations below the seabed; the high-powered acoustic sources are normally fed with compressed air supplied by compressors onboard.

These systems cannot be used if the sea surface is frozen and/or interested to bad weather.

Systems which produce sound waves directly from the surface of sea, if frozen based on vibrating or striking sources, if free from ice based on systems on tow of boats, have numerous operative problems and in any case have strong limitations of use linked to the thickness of the ice or the intensity of wave motion which must guarantee the safety of the operations.

Furthermore, the plants of the known art must be transported far from the base site with considerable utilization costs.

A further disadvantage of compressed gas acoustic sources currently used consists in the fact that their air requirement is such that, if this is not taken directly from the atmosphere, their realization becomes extremely complex and cumbersome if they are installed on autonomous vehicles not in contact with the atmosphere.

SUMMARY OF THE INVENTION

These and other problems are solved by the present invention by means of a system for generating pressure waves consisting of one or more autonomous underwater vehicles organized in swarms for automatically effecting deep seismic surveys in sea environment, in particular for use in arctic areas, where the presence of surface ice and/or contrary meteorological conditions prevent the normal navigation or difficult access of sea vessels. This is achieved according to a first aspect of the invention by means of a system which has the characteristics of claim 1 and possibly of at least one of the claims from 2 to 4.

A second aspect of the invention comprises a device for generating pressure waves in sea environment in conformance with claim 5 and possibly with at least one of the claims from 6 to 8.

A further aspect of the invention relates to a method for generating pressure waves in according with at least one of the claims from 10 to 12.

The system of the invention replaces the conventional transportation system of entrained sources of a ship, with the use of self-propelled and autonomously guided acoustic sea sources, mainly aimed at solving the problem which arises in areas in which conventional vehicles cannot have access to the sea surface, due, for example, to the presence of ice and/or surged sea.

This system, in its general structure, comprises one or more autonomous underwater vehicles organized in swarms, each housing an acoustic seismic sea source and having an overall action analogous to that of a conventional system (air-gun array), (i.e. a geometrical organization of individual seismic sources activated according to a predefined scheme in order to increase the energy that enters, minimizing the resonance effects by constructive interference due to the bubble coalescence), and a system of surface stations relating to these.

The surface stations are supporting stations for reprovisioning, recovery actions, checking the well-being of the single vehicles and swarms and maintenance.

An important part of the invention consists of an innovative seismic sea source of the acoustic type, specifically suitable for installations onboard these sea vessels which do not have an available external supply of compressed gas, capable of releasing a high-intensity pressure wave produced by a system of two striker pistons, which does not consume air for its functioning and does not pollute, as it does not release air or a any other gas into the water, which does not produce mass variations of the device during its functioning and therefore does not modify its floating properties, which allows the amplitude and duration of the sound wave emitted and consequently the characteristics of the emission spectrum, to be regulated.

DETAILED DESCRIPTION OF PARTICULAR EMBODIMENTS OF THE INVENTION

General Structure of the System of the Invention

Figure 2:
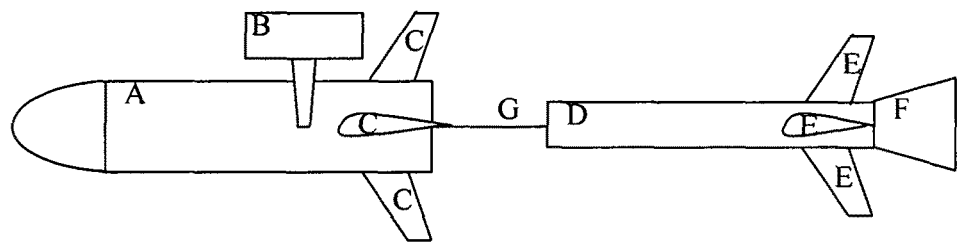
Figure 3:
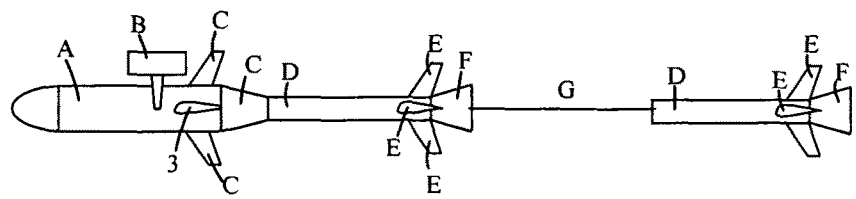

Each acoustic seismic source is designed as an integrant part of a small-sized autonomous underwater vehicle in turn forming part of a swarm of vehicles, whose action is equivalent to that of a conventional array, of which a single unit is represented in an external view in FIG. 1, which navigates without a pilot or crew onboard, as its navigation is controlled by an autonomous guiding system and/or a remote control system. The vehicle is composed of two parts, the power unit A, equipped with one or more propellers B (only one represented in FIG. 1) and configuration control surfaces C, which is connected by means of a rigid, elastic or loose joint H, to the acoustic source D which emits the pressure wave from the diffuser F, having configuration control surfaces E. A particular case of this configuration is represented in FIG. 2 where the source D is pulled by the power unit A and the joint H is reduced to a system G of one or more cables. The single autonomous vehicles can be used in a variable number arranged according to geometrical navigation schemes (swarms) depending on the seismic acquisition parameters determined each time on the basis of the requirements of the prospecting campaign. An example is provided in FIG. 3.

Figure 4:
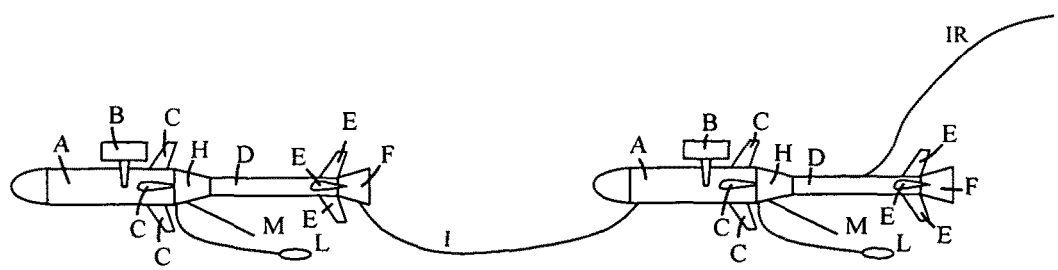

The vehicles of the type described, which, according to the surrounding environmental conditions, can be or lowered beneath the layer of ice in correspondence with openings produced artificially on the layer of ice itself or they can be operated beneath the zone of interference of wave motion or they can be launched from a support vehicle, navigate in complete immersion in formation, whose configuration depends on both the control strategy implemented onboard and on the geometrical organization and scheme required for operating the sources, at a depth sufficient for avoiding the frozen surface structures and/or interference of wave motion and at the same time adapted for guaranteeing the successful result of the seismic prospecting. These vehicles transport the acoustic sources which are activated in synchrony on the basis of the geophysical and technical acquisition parameters processed for the prospecting campaign according to a pre-established program. During navigation, the vehicles exchange data relating to position, velocity, configuration, activation state of the relative acoustic source by means of a telecommunication system with acoustic and/or electromagnetic support and/or via cable, to supply the information necessary for the automatic guiding of the fleet and activation and synchronism of the seismic sources, and they also transmit data relating to the functioning and control attributes to the surface station. The vehicles can be mechanically disconnected from the surface station or, if necessary and in particular cases, one or more vehicle of the fleet can remain connected to it during navigation by means of an umbilical cable IR which comprises telecommunication and data transmission cables and pipelines for carrying technical fluids to the vehicle. A representation of the most general connection between two vehicles of the fleet and of one of these to the station is provided in FIG. 4, which shows the electromagnetic transmission antennae M, the entrained transmitters/receivers L for acoustic transmissions and a possible connection via cable I, either for electric and/or optical signals and a possible umbilical cable IR.

Figure 5:
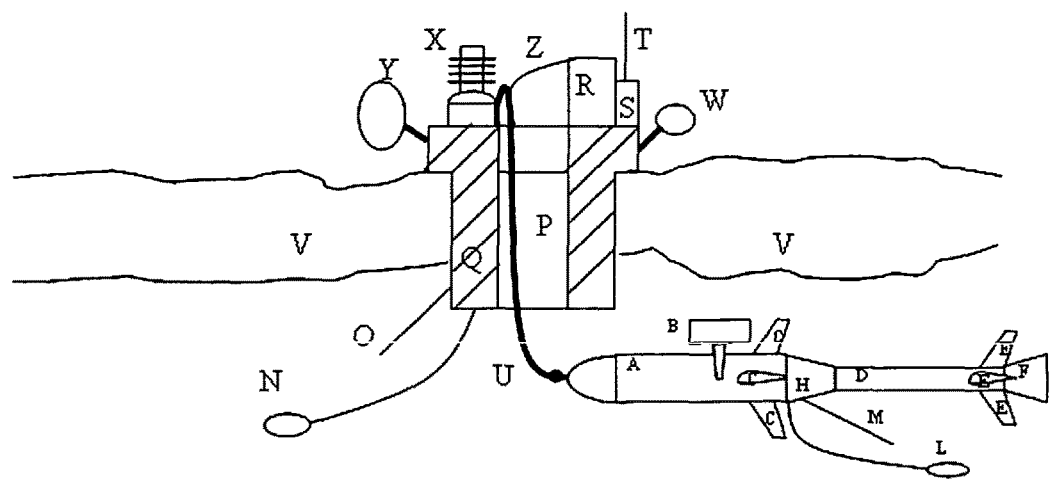

The swarm of underwater vehicles therefore transports a combination of acoustic seismic sea sources along a pre-established trajectory studied for the geophysical investigation of an area whose extension depends on the autonomy capacity of the vehicles of the swarm. At the end of the data acquisition phase, the vehicles rise below the layer of ice and/or interference of wave motion in correspondence with a transportable station represented in FIG. 5 previously equipped, installed by creating a hole on the frozen surface V which houses the station consisting of a cylindrical pipe Q in which there is an inspection cavity P for the vehicles, which also allows, if necessary, the extraction of a vehicle for maintenance operations or for its substitution. If there is no ice, the station is completely floating and is kept in position by means of an anchoring system to the seafloor. The station is equipped with an electric generating group X with attached compressors and pumps for the recharging of batteries onboard and possible pressurized tanks of the station (for example Y and W) and vehicle, a data memorization and processing system R discharged from the data acquisition system onboard, a radio station S with an antenna T for air communications with a possible remote station, said station being on land, tanks Y and W for technical fluids, for example gases, lubricating liquids and cooling fluids for allowing the correct functioning of the mechanical components of both the power unit of the vehicle and acoustic source. All the cables, pipes and ducts carrying the electric, mechanical and processing services to the vehicles are joined in a single collector U whose end is automatically hooked to a service union on the surface of the vehicle.

A series of operations are thus effected at the surface station, such as: supply of electric energy, gas and technical fluids, connection for the unloading of data acquired from the navigating vehicles, control operations of the state of efficiency of all the devices and plants onboard the vehicle, possible recovery through the cavity P of a whole vehicle.

The station is also equipped with a water telecommunication system, on an electromagnetic support through the antenna M, and/or acoustic, through the acoustic transmitter/receiver N immersed in water, from/and towards the navigation vehicles.

Once the operations at the surface station have been completed, the vehicles continue their in depth navigation and, following a new trajectory, investigate a new area. In the meantime the surface station is removed and transported by operators on the surface towards the new berthing point of the underwater vehicles and installed there for providing the supplies necessary for the fleet at the end of the new investigation. The operation is repeated sequentially until the whole area of interest has been explored.

Seismic Source

The seismic source of the invention is a compact source specifically developed for installation onboard the vehicles previously described and is a possible source D to be included in the structure of the system proposed This source consists of a cylinder in which two pistons slide: the first, called striker piston, driven by high-pressure gas supplied by a suitable pressurization system described hereunder, is thrust at a high velocity towards the second piston, called pump piston, situated at a suitable distance from the first piston (said distance being adjustable) which, on the surface opposite to that struck by the striker piston, communicates with the water of the sea environment; the impact of the striker piston on the pump piston produces a high acceleration of the latter which in this way, already at the beginning of its pumping run of water outside the cylindrical pipe, releases a high-intensity pressure disturbance followed by the pressure wave again generated by the pump piston during the remaining phase of its run, in which the high-pressure gas acts on the striker piston which in turn pushes the pump piston.

The impact process allows the kinetic energy produced by the expansion of the gas during the free run of the striker itself to be accumulated in the striker piston, part of which is released to the pump piston in the impact in very short times already at the beginning of its pumping run. This allows a very high pressure peak to be released in water, even much higher than the feeding pressure of the striker piston, extending the acoustic excitation frequency band of the device.

The regulation of the initial position of the pump piston along the cylinder allows qualitatively different pressure waves to be distributed. If the striker piston has a short free run before the impact, i.e. the pump piston is positioned close to the striker piston, the pressure wave generated by the device has a longer duration and an initial pressure peak of a lower amplitude; in this case the energy released by the expansion of the gas is concentrated on a lower frequency band. If the striker piston has a longer free run before the impact, i.e. the pump piston is positioned at a distance from the striker piston, then the pressure wave generated has a shorter duration and a higher initial pressure peak, and the gas expansion energy is concentrated on a relatively higher frequency band. The striker piston therefore has a double function: to regulate the maximum intensity of the pressure wave, by amplifying its amplitude to even higher values with respect to the feeding pressure of the gas which acts on the striker piston, and to regulate the duration of the emission of the pressure wave from the pipe by modifying its acoustic emission spectrum.

The feeding pressure of the striker piston is supplied by a tank of precompressed gas which always remains inside the device and is not released into the water, which is put in communication, through specific valves, with the cylindrical pipe in which the two pistons slide; the gas contained in the tank expands during the isolated run of the striker piston and during the coupled run of the striker piston and pump piston and is recompressed, in a subsequent phase, with the use of a high-prevalence pump activated by an electric motor fed by a specific set of batteries. The source is therefore completely autonomous, it does not require an external compressed air source as it always effects the expansions with the same air mass, and the energy for the pressure release is indirectly supplied by the set of batteries which feeds the pump, the impact process between the pistons allowing the release of pressure waves whose amplitude is also much greater than the pressure maintained in the feeding tank.

The seismic source described in the present patent is particularly suitable for being loaded onboard small-sized autonomous underwater vehicles which can navigate in immersion. The seismic sources currently adopted, in fact, which are known as air-guns, generate the pressure wave by expanding compressed gas, supplied by a suitable compressor onboard a ship, directly in the water with the following limits: they require a continuous air supply, a compressor and finally the gas bubble which generates the sound wave is dispersed in the water with a consequent enormous consumption of gas. These characteristics make the air-gun system not optimum for being loaded onboard small-sized underwater navigating vessels as they cannot avail of continuous air supplies to be processed with a compressor and also because the tank storage of precompressed gas, for reasons of weight and encumbrance linked to the considerable gas consumption, is not practical on these vehicles; furthermore during the functioning of the air-gun, the storage tank decreases in weight, radically changing the floating conditions of the vehicle and therefore requiring the use of compensation tanks.

In the present patent application, the seismic source always uses the same gas mass, as it does not release the expanded gas into the water, suitably recompressing it each time, separating water and air (or other gas) through a specific piston which serves for both generating the pressure wave (in its direct movement) and recompressing the gas (in its retrograde movement), using a second striker piston so as not to diminish the acoustic distribution performances of the device due to the presence of the pump piston, increasing both the rapidity of the generation of the sound wave and the maximum pressure level generated which is even higher than that which would be obtained by expanding the air directly in contact with the water as in an air-gun.

For the sake of clarity, the invention is first presented by describing the functional scheme of the acoustic emission pipe and then in a subsequent paragraph the pressure supply system, of both the air and water which feed the emission pipe and finally describing an electromagnetic system for the activation of the pistons.

The enclosed caption describes the various components which appear in the description of the invention and in the figures.

Acoustic Emission Pipe

The schemes presented in this paragraph describe a possible embodiment of the device and in particular the functioning of the thrust and acoustic emission pipe alone, which operates according to 8 phases, the hydraulic and pneumatic pressure supply systems which intervene in each functioning phase being described in the subsequent paragraph.

For greater clarity, the tubes and valves activated in each phase are marked with a thicker outline. The enclosed caption includes the description of the various components of the device, where possible pressure values and lengths are indicated in brackets, for illustrative purposes.

The system essentially consists of a cylindrical pipe 8 and two pistons 1 and 2 which slide in it, respectively called striker piston and pump piston. The striker piston 1 is thrust by pressurized gas along the portion 9 (thrust pipe) of the cylinder 8 towards the pump piston 2 which is in contact with the water of the sea environment. The impact between the two pistons generates a very intense pressure wave which propagates along the portion 10 (emission pipe) of the cylinder 8 to be then released into the sea environment through the diffusers 11 which improve the acoustic efficiency of the device by an impedance adaptation between the pipe 10 and sea environment. The impact is followed by the run of the pump piston 2, pushed by the striker piston, which generates the pressure wave. When the piston 2 reaches the run-end, the system brings the pistons back to their original position to allow a new acoustic emission.

The functioning details of the system of the invention are provided hereunder.

Figure 6:
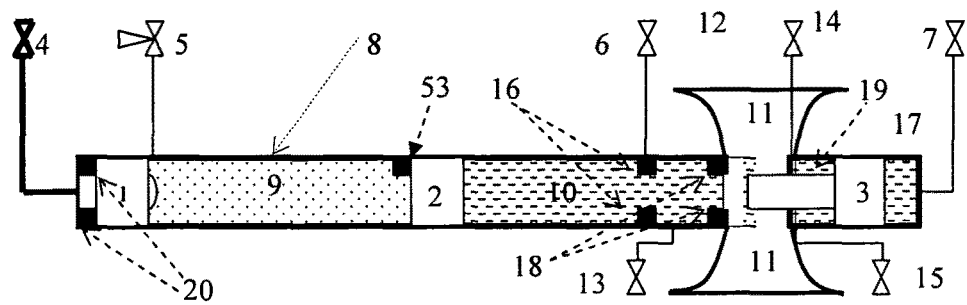
Figure 7:
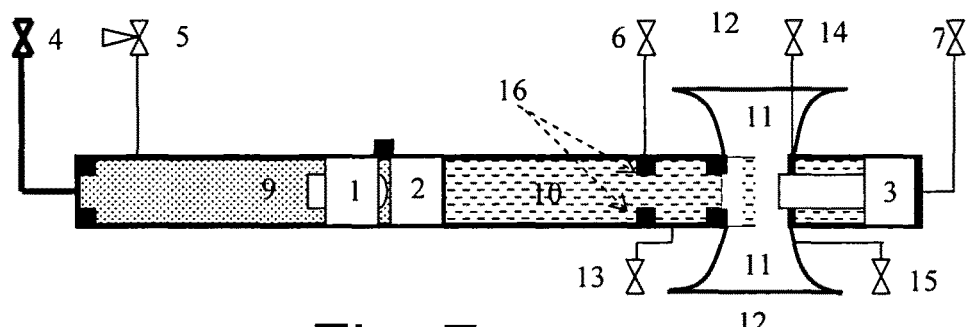

PHASE 1 (FIG. 6): All the valves are initially closed; opening of the valve 4 which is in communication with the high-pressure gas line (see below), for example 200 bar: the left part of the piston 1 is brought to high pressure, the right part, on the other hand, communicates with the thrust pipe 9 which is initially at low pressure, for example 0.1 bar and the acceleration of the striker piston 1 is produced through the thrust chamber 9. The piston 2 is held in position in the cylinder 8 by the disinsertable stop 53 which prevents it from retrograding towards the striker piston 1, the piston 2 being subjected to a pressure difference existing between the sea environment, for example 2 bar (initial pressure in the pipe 10), and the pressure, lower, exerted in the pipe 9, for example 0.1 bar. The stop 53 is removed (see FIG. 7) upon the opening of the valve 4, leaving the pump piston free. The latter, subjected to the pressure difference between the environments 9 and 10 (for example 1.9 bar), retrogrades before the impact with the piston 1 along a very small length with respect to the free run of the piston 1 which, on the other hand, moves under the action of a much greater pressure difference (about 200 bar).

More than one stop similar to 53 can be envisaged, positioned along the cylindrical pipe 8, to be able to regulate the position of the pump piston and consequently the free run of the piston 1 and pumping run of the pump piston 2, thus also regulating the pressure emission and its range. The control of their insertion and disinsertion can be simultaneous for all of them.

PHASE 2 (FIG. 7): End of the thrust run of the striker 1 in the thrust pipe 9, impact of the striker 1 on the pump piston 2 and start of the joint run of the striker 1 and piston 2 which move integrally. Emission of the high-pressure impulsive wave peak towards the sea environment 12 through the emission pipe 10 and diffusers 11.

Figure 8:
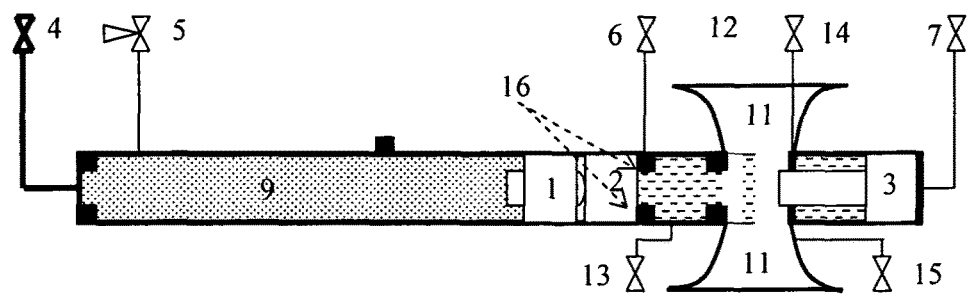

PHASE 3 (FIG. 8): The pistons 1 and 2 are pushed by the high pressure generated in the thrust chamber 9 causing the pumping run of the water along the emission chamber 10 which is expelled through the diffusers 11 and is introduced into the sea environment 12. The violent pumping of the water generates a pressure wave until the stoppage of the pistons 1 and 2 against the stops 16 integral with the emission pipe. With this phase, the pressure wave release function is terminated. The subsequent phases are those for the repositioning of the pistons 1 and 2, and recharging of the thrust tank 22 described in the following paragraph.

Figure 9:
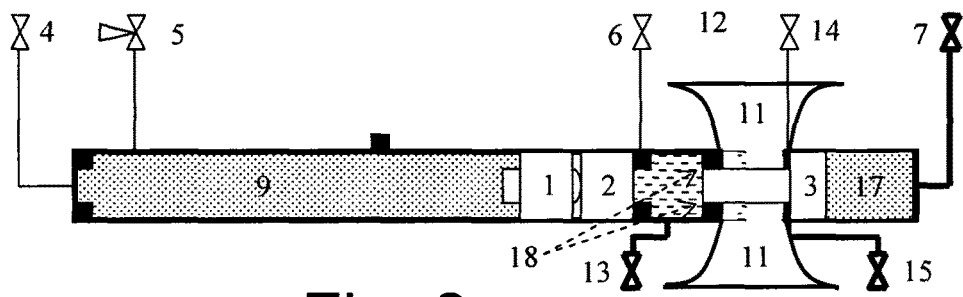

PHASE 4 (FIG. 9): Closing of the valve 4, opening of the valve 7 for the entrance of high-pressure gas (for example 205 bar) into the pneumatic thrust chamber 17 of the cut-off 3, opening of the valves 13 and 15 for the outflow of the water, run of the cut-off 3 for engagement with the seat 18 of the cut-off situated at the end of the emission chamber. The emission pipe 10 is therefore closed, preventing communication with the diffusers 11 and therefore with the sea environment.

Figure 10:
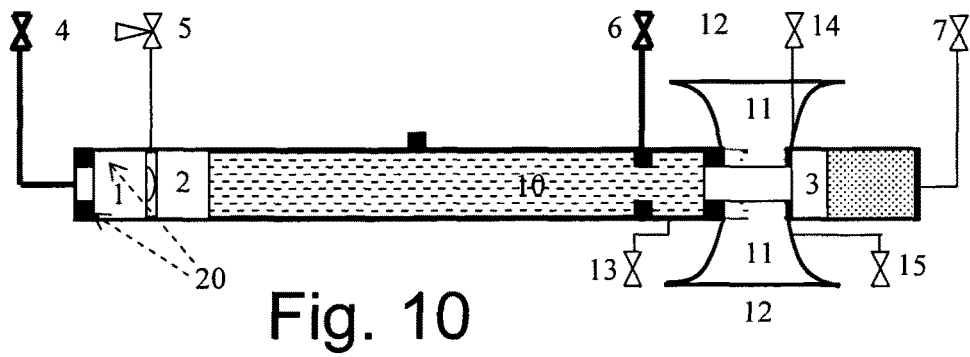

PHASE 5 (FIG. 10): Closing of the valves 13 and 15; opening of the valve 4 for the outflow of air, opening of the valve 6 for the entry of high-pressure water (for example 205 bar) into the emission chamber and repositioning of the piston 1: the pistons 1 and 2 slide integrally along the emission chamber 10 until they reach the run-end stops 20 of the piston 1.

Figure 11:
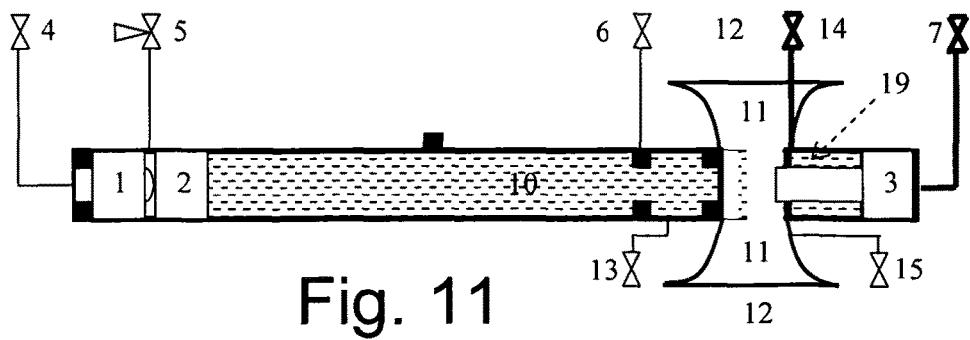

PHASE 6 (FIG. 11): Closing of the valves 6 and 4; opening of the valve 14 for the entry of high-pressure water into the hydraulic thrust chamber 19 of the cut-off 3 and repositioning of the same cut-off 3, with opening of the valve 7 until the complete outflow of air and then closing of the valves 7 and 14.

Figure 12:
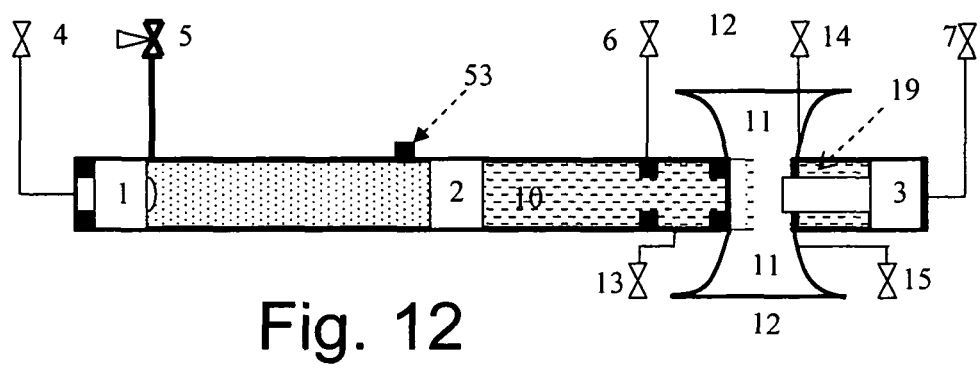
Figure 13:
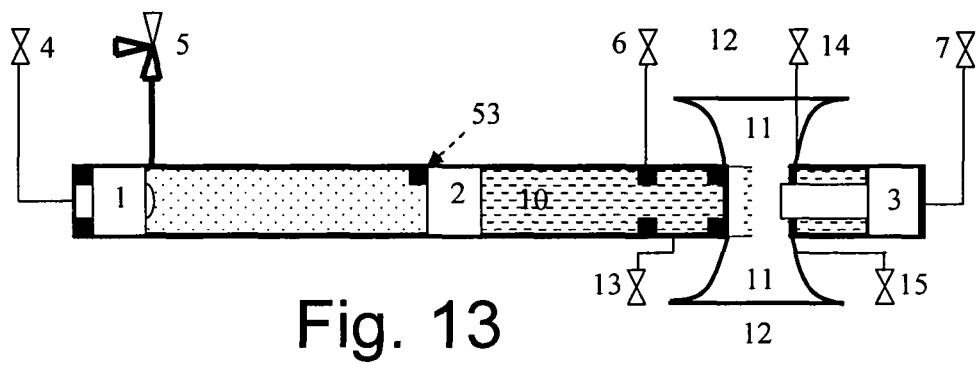

PHASE 7 (FIG. 12): Opening of the valve 5 for the entry of low-pressure air, piston 1 immobile at run-end, low-velocity movement of the piston 2 in the emission pipe with emptying of the thrust pipe and repositioning of the striker 2 until it overtakes the position of the stop 53 inside the emission pipe 10. Insertion of the stop 53, as in FIG. 13. If there are several stops similar to 53 at different distances along the cylindrical pipe, the opening time of the valve 5 is calibrated so as to enable the piston 2 to reach the relative stop position desired.

PHASE 8 (FIG. 13): Commutation of the valve 5 on the vacuum tank 37 (see scheme of following paragraph) for emptying the air from the thrust pipe 9 and restoring initial conditions (see phase 1). The pressure difference between the pipes 9 and 10 cause the piston 2 to retrograde until it reaches the blockage of the stop 53.

A possible variant of the system for activating and repositioning the cut-off 3 consists in activating it hydraulically in the closing phase of the chamber 10, sending high-pressure water (instead of high-pressure air as in the previous scheme) into the hydraulic thrust chamber 17 (and no longer pneumatic) through the valve 7, said valve now comprising a two-way commutation (one for the entry of high-pressure water, the other for the outflow of the water into the sea environment), and housing a system of retention springs 21 (metallic or gas) in the chamber 19 (no longer hydraulic). In this case, both valve 15 and the valve 14 are eliminated with their relative circuits.

Phases 4 and 6 described above can be modified in phases 4 bis and 6 bis as follows.

PHASE 4-Bis (FIG. 14): Closing of the valve 4, opening of the valve 7 on the high-pressure water entry path into the hydraulic thrust chamber 17 of the cut-off 3, opening of the valve 13 for the outflow of water, run of the cut-off 3 until engagement with the seat 18 of the cut-off 3 situated at the end of the emission chamber and compression of the retention springs 21 housed in the chamber 19. Closing of the valve 7 for keeping the cut-off 3 engaged with the seat 18.

The emission pipe 10 is therefore closed preventing communication with the diffusers 11 and consequently with the sea environment.

PHASE 6-bis (FIG. 15): Closing of the valves 6 and 4; commutation of the valve 7 on the discharge outlet into the sea environment, the cut-off 3 moves under the action of the retention springs 21 emptying the hydraulic chamber 17, returning to the run-end position and re-opening the emission pipe 10.

A further variant relates to the impact process between the pistons 1 and 2. In the previous scheme, the striker 1 is a simple piston which, after the impact, continues its expansion run pushed by the high-pressure gas together with the pump piston 2. The possible variant envisages a striker piston which, after the impact, does not continue its run together with the pump piston but allows the pressurized gas, through the opening of a specific valve or passage span activated by the impact, to reach the pump piston 2 directly forcing only the latter in the pumping run.

Figure 16:
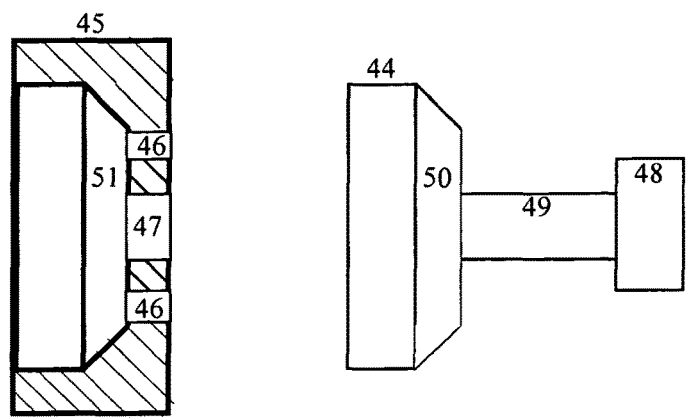

A possible embodiment of a similar striker piston is described in FIG. 16. The striker piston consists of two pieces:

the striker case-valve 44, with the impact case 48, the rod 49 and the head of the truncated-conical valve 50;

the housing piston 45 (which runs in the cylinder 8) with the passage spans of the gas 46, the seat 47 for the rod 49 and the seat 51 for the truncated-conical head 50.

Figure 17:
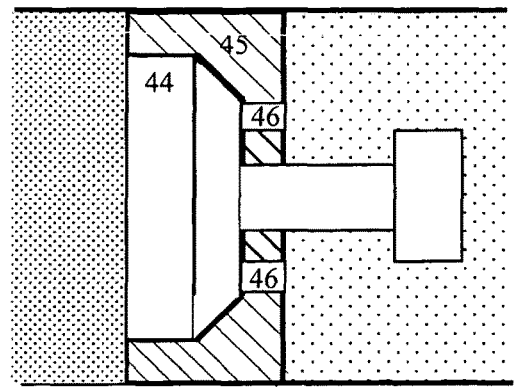
Figure 18:
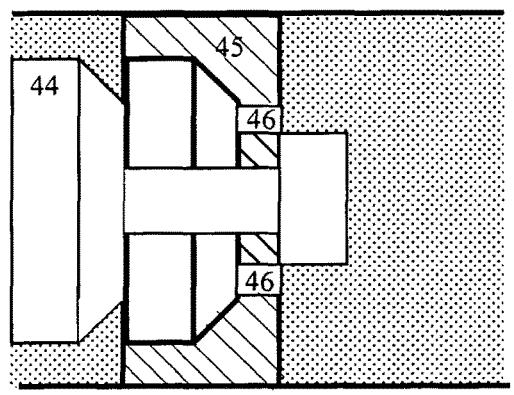

The assembled system, which as a whole forms the striker piston 1, is shown in FIG. 17 in the thrust configuration and before the impact with the pump piston 2. The case-valve 44 is housed inside the piston 45 and the larger surface of this with respect to that of the piston 45 exposed to the high-pressure gas coming from the left in the drawing, generates the closing force of the valve which, with the head 50 forced into the seat 51, closes the spans 46. When the impact case 48 strikes the pump piston 2, the case-valve 44 undergoes a violent deceleration, so that the piston 45 slides with respect to the case 44 allowing the spans 46 to open, enabling the gas to flow out also into the part of the cylinder 8 to the right of the piston 45, as illustrated in FIG. 18. As the pieces 44 and 45 no longer insist on these a pressure difference, they end their run separately from the piston 2, whereas the pressure difference existing between the feeding pressure of the valve 4 and the pressure in the emission pipe, initially equal to that of the sea environment, now insists on the piston 2, already accelerated by the impact. The pumping phase of the water outside the emission pipe therefore only takes place, in this case, on the part of the pump piston 2. Apart from the difference relating to Phase 3 described hereunder, all the remaining phases remain identical.

Figure 19:
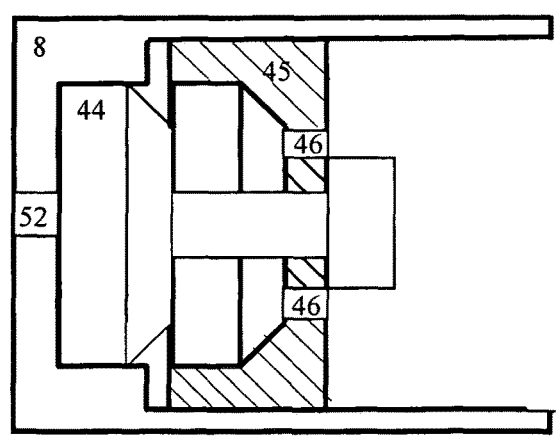

Some details on the functioning of the piston 1 thus conceived: during Phase 5, the piston 2 pushes the piston 1 in correspondence with the impact case 48, so that in the movement of the piston 1 so as to reach the run-end stops 20, the relative position between the case 44 and housing piston 45 is that represented in FIG. 18. Finally, FIG. 19 represents the configuration of the system once the stops 20 situated in the cylinder 8 have been reached. In this way, when in Phase 1 the high-pressure gas introduced through the valve 4 is conveyed to the cylinder 8 through the hole 52, the case-valve 44 is forced to slide with respect to the piston 45, the truncated-conical head 51 becomes engaged in the seat 52, thus closing the spans 46. The piston is then in the configuration represented in FIG. 17 starting its thrust run through the pipe 9.

Air and Water Pressure Supply Plant

Figure 14:
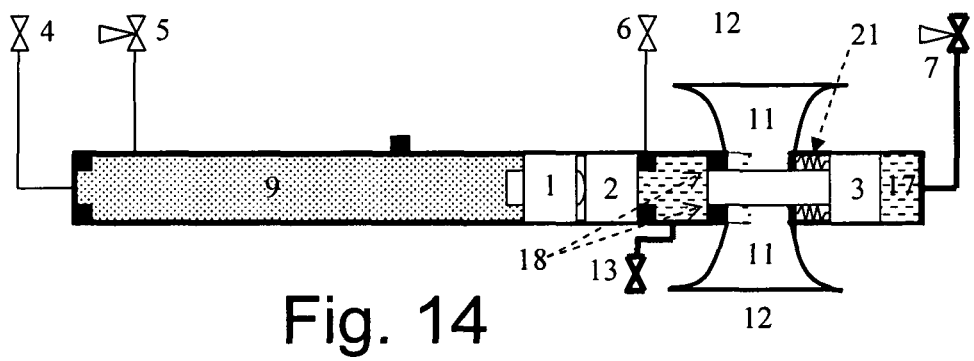
Figure 15:
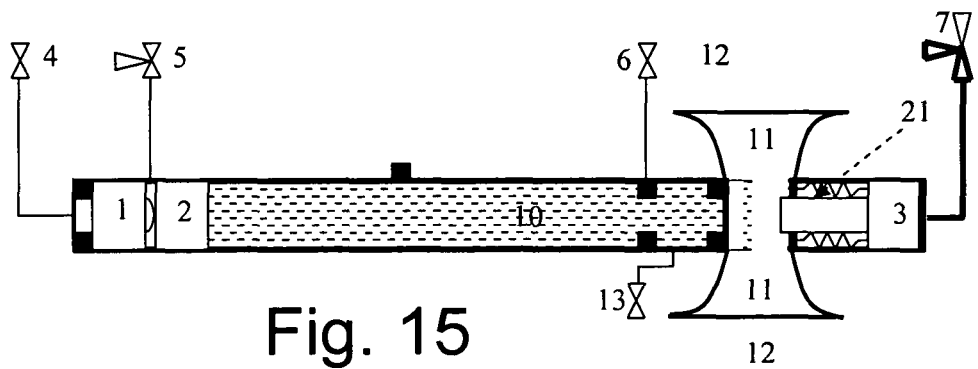

The functional scheme described hereunder refers to a possible embodiment of the water and air pressure supply system for the functioning of the seismic source according to the scheme previously described, with the use of a plant which always adopts the same air mass. The scheme refers to the emission pipe formed with a cut-off having a spring opening as represented in FIGS. 14 and 15.

The pressurization device essentially consists of a first tank 22 containing pressurized gas, for example at 200 bar, for propelling the striker piston and pump piston, a second tank 23, called accumulator, containing water and gas at a slightly higher pressure, for example 205 bar, kept at the desired pressure by means of the water level regulation in the tank 23 controlled by a high-prevalence water pumping group 24. The gas in the tank 23 exerts the recharging of the tank 22, recompressing the gas through the movement of the piston 1 in the cylinder 8, returning it to its original seat in correspondence with the stops 20, thus restoring the original pressure level (for example 200 bar) in 22 after the gas contained therein has expanded to thrust the pistons 1 and 2.

Figure 20:
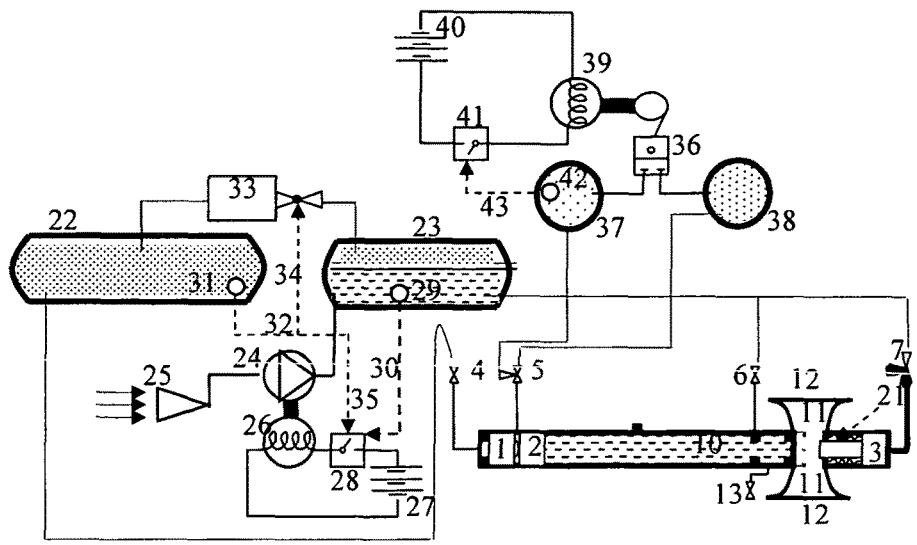

This functioning principle is obtained, for example, through the pressurization plant presented in FIG. 20. The description of the functioning, for greater clarity, is illustrated with reference to the previous work phases of the emission pipe.

In Phase 1, the tank 22 is already at high pressure (for example 200 bar) ready to supply the pressure through the valve 4. When the valve 4 is opened, the gas expands allowing the thrust of the striker piston 1 and the pressure in the tank 22 is lowered to a minimum value reached when the two pistons reach their run-end following Phases 2 and 3 previously described.

Phase 4 is the closing phase of the pipe 10 by means of the cut-off 3. The valve 7 is opened, thus opening the communication between the hydraulic thrust chamber 17 and the high-pressure water accumulator 23 producing the movement of the cut-off. At the run end reached by the cut-off, the valve 7 closes thus blocking the cut-off in its closed position.

Phase 5 is the recharging phase of the thrust and pumping tank 22 and also the repositioning phase of the piston 1. The opening of the valve 6 opens the communication between the emission pipe 10 and the accumulator 23: the pistons 1 and 2, move integrally under the pressure difference existing between the tank 22, which is at its minimum pressure (corresponding to the maximum volume of the gas contained therein) and the maximum pressure of the accumulator 23 (corresponding to the minimum volume of the gas contained therein). The system is calibrated so that the pressure in the tank 23 is always greater than that in the tank 22. Under this pressure difference, the pistons retrograde in the pipe 8, the gas flows through the valve 4, which is open, into the tank 22 thus increasing its pressure up to the initial value it had in Phase 1, which is reached when the piston 1 arrives at the run end on the stops 20. The high-pressure water contemporaneously flows out of the tank 23 through the valve 6, thus decreasing the pressure in the accumulator 23 to the minimum value, reached when the piston 1 reaches the run end.

The tank 22 is therefore ready for supplying a new pressure impulse. The tank 23, on the other hand, is at a lower pressure than that it had initially in Phase 1 and with a water level which is also lower. The restoring of the pressure and water level in the accumulator 23 is effected by activating the group 24 of high-prevalence pumps which suck in water from the sea environment through the sea intake 25 and force it into the tank 23, with the valve 6 closed, until the initial level of the water and pressure has been restored on the basis of the pressure level measured by the sensor 29 which drives the relay on the circuit of the pump motor.

This is followed by Phase 6-bis: with the valves 4 and 6 closed, the valve 7, first closed, is opened and puts the chamber 17 in communication, through the commutator, with the outside environment, the water contained in the hydraulic thrust chamber 17 flows out under the action of the retention springs 21 and the cut-off is brought into opening position.

Phase 7 follows: the valve 5 is opened and puts the gas tank 38 in communication with the thrust chamber 9. The pressure difference between the chamber 9 and pipe 10 allows the piston to slide along the cylinder to the desired position. The initial pressure difference is suitably calibrated. When the final position has been reached by the piston 2, the blockage of the same piston intervenes through the insertion of the stop 53.

Phase 8 follows: the valve 5 commutes, putting the low-pressure tank 37 in communication with the thrust chamber, lowering the pressure of the latter and decreasing the density of the air to reduce the air-cushion effect in the impact phase between the pistons.

As a result of this latter phase, the pressure in the tank 37 increases and that of 38 decreases. The sensor 42 reveals the pressure in 37 and above a threshold value, which can be calibrated, it drives the relay 41 which starts the motor 39 which activates the compressor 36 which, by sucking gas from 37 and sending it to 38, re-establishes the initial pressure values by lowering it in the tank 37 and raising it in the tank 38.

Finally, before re-activating the device for the supply of a new pressure impulse, the system, through the pressure sensor 31 verifies whether the pressure in the tank 22 is that established and, if it is lower due to small gas losses as a result of leakage, the valve of the drier 33 is opened, which allows the passage of gas from the tank 23 to 22 which thus supplies the reintegration air mass also activating the start-up of the group of pumps 24 for re-establishing the pressure value in the accumulator 23 which is suitably recharged with gas in the stops at the surface station. The drier eliminates the water residues which could lead to the formation of ice inside the valve 4 during the thrust expansion.

Electromagnetic Activation System of the Pistons

The striker and pump pistons can be activated through electromagnetic forces, using this method alone for the propulsion of the striker piston 1 or this combined with the pneumatic and hydraulic activation system described above.

Figure 21:
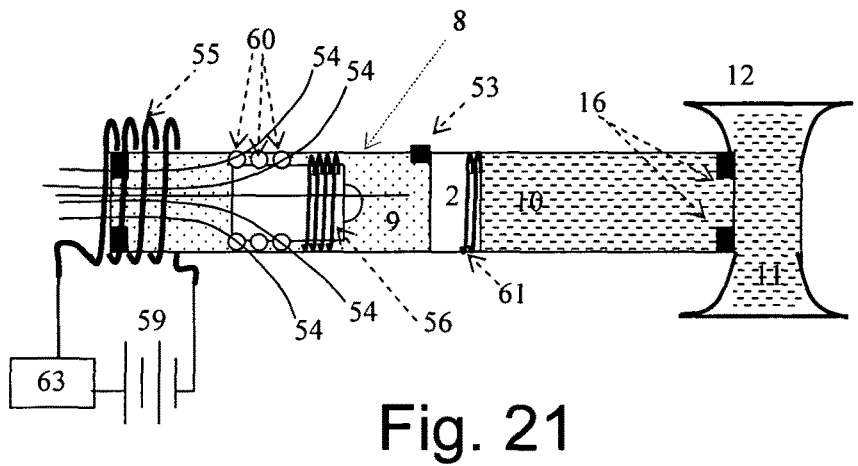

In principle, the cylinder 8, as shown in FIG. 21, is in this case equipped with a solenoid integral therewith, which generates a magnetic field inside the thrust pipe 9 with field lines 54 also having a radial component, consisting of an induction coil 55. The striker piston 1 is in turn equipped with an armature solenoid 56 with an axis which always coincides with the axis of the thrust pipe 9. The two solenoids can belong to separate electric circuits or they can be connected in series. A high-amperage current produced by the batteries 59, modulated through the control system 63, is injected into the solenoid 55 generating a variation in the magnetic field which induces a current in the armature solenoid 56 which thus generates a repulsive Lorentz force on the armature 56 itself, by interaction with the field lines 54, with an axial component suitable for accelerating the piston 1 along the thrust pipe 9. When the solenoids are connected in series, the current in the solenoid 56 which produces the Lorentz force can be collected by means of sliding contacts.

Figure 22:
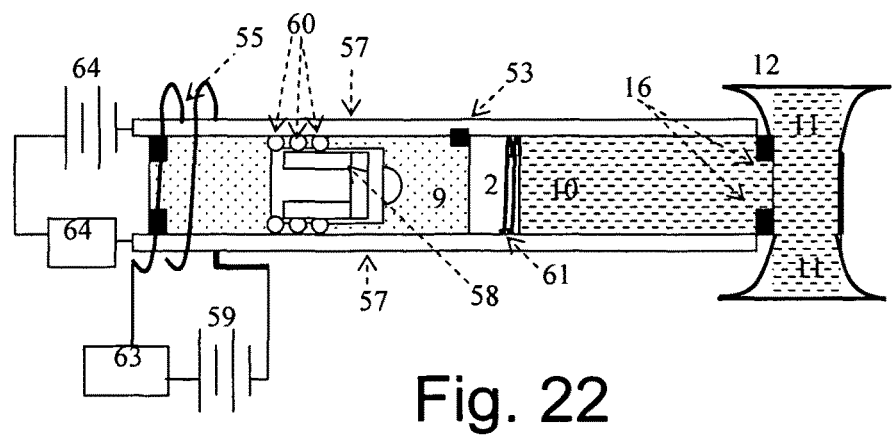

The electromagnetic thrust system can also be produced through induction tracks 57, as represented in FIG. 22, consisting in two or more adjacent conductors 57, called tracks, connected through a conducting armature 58 assembled integral with the striker piston 1 and in contact with the tracks 57 by means of electric contacts also produced through the balls or rolls 60 of the bearing on which the striker piston 1 runs. The two conductor tracks 57 are fed at the ends which are situated on the same side with opposite polarities, so that the current produced by the batteries 64 is injected into a track and directed to the parallel track through the armature 58 which closes the circuit through the conductor balls 60. The currents circulating in the tracks induce a magnetic field with approximately circular field lines lying on planes orthogonal to the axis of the tracks 57 thus generating a Lorentz force on the armature 58 electrically connected in series with the tracks 57 and mechanically integral with the striker piston 1 which is thus accelerated along the thrust pipe 9. Also in this case, there is an induction coil 55, as illustrated in FIG. 22, which however has a much smaller number of spires with respect to the previous case, as it is not used for the propulsion phase of the pump piston 2, but only in its repositioning phase along the thrust pipe 9 as described hereunder.

The striker piston 1 can also be propelled through a mixed system with a track and armature combined with a solenoid winding system, so that there is a coil 55 with a high number of spires, together with the solenoid 56, tracks 57 with the armature 58 in the same device.

In the case of the electromagnetic actuation of the striker piston 1, as it does not have to guarantee a pressurized air seal, this runs in the thrust pipe by means of roll or ball bearings 60 with a very low friction favouring the mechanical efficiency of the device, and the piston 1 itself can be completely perforated and with a smaller diameter of the cylinder 8, thus allowing the passage of air through and around the piston 1, avoiding attenuation effects of the impact with the piston 2 due to the presence of an air cushion between the striker piston and pump piston, and also allowing the striker piston 1 to not interfere in its run with the stop 53. In some construction embodiments this allows not only the air and water pressurization system to be avoided, but also the air suction system in the thrust chamber 9, favouring the construction simplicity and lightness of the device.

The pump piston 2 is also equipped, both in the case of functioning with conductor tracks and also in the case of an induction coil 55, with an induced coil 61 which is provided with a much lower number of spires than that of the striker piston 1 and possibly also equipped with a controlled switch, which is possibly closed, allowing the circulation of the current on the induced coil 61 from 55, only at the end of the pumping run to product a Lorentz force only for the time necessary for the repositioning of the piston 2, after which the controlled switch re-opens the circuit of the induced coil 61 making it inactive. The function of the coil 61, in fact, is not propulsion for the piston 2 in the pumping movement but is simply to generate the forces, much smaller, necessary in the sole retrograde movement of the piston 2 in the repositioning phase along the thrust pipe 9.

The repositioning of the pistons 1 and 2, after they have reached the pumping run end, takes place by inversion of the currents in the coil 55 and/or tracks 57, driven by the controller 63 and/or 62, thus producing an inversion of the Lorentz force which pushes the pistons 1 and 2 to reascend along the cylinder 8 in the directions of the stops 20. The piston 1, suitably dimensioned, passes without interfering with the stops 53, as its section is smaller than that of the cylinder 8, whereas the piston is blocked by these. The system is therefore ready for a new acoustic emission.

The electromagnetic actuation system can have a further simplification with respect to the hydropneumatic actuation consisting in the elimination of the cut-off 3 and relative actuation circuits.

Figure 23:
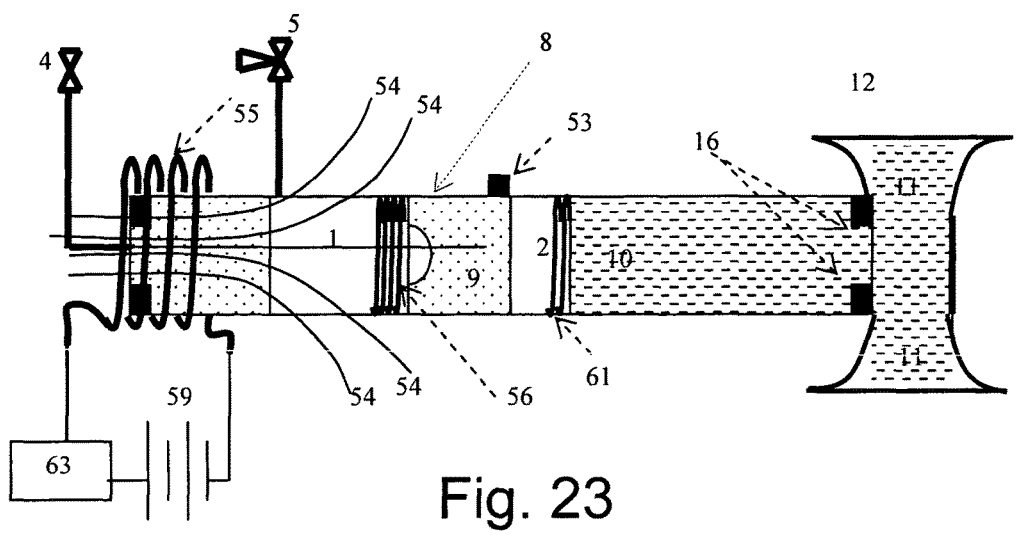

Finally, FIG. 23 represents, for example, a mixed propulsion system for the striker piston with both pneumatic activation, through the action of the high-pressure gas sent through the valve 4, and electromagnetic, operated with the coils 55 and 56. In this case, the striker piston is an air-tight piston as can be seen in FIG. 23. The repositioning system of the pistons can take place in this case only (even if not necessarily) electromagnetically, excluding phase 7, operated through the valve 5 and the relative pressurization system. The pressurization plant relating to this mixed system is illustrated in FIG. 24 whose functioning is identical to that described in FIG. 20, the mixed system illustrated lacking however the tank 22 and also the cut-off system of the chamber 10.

Detailed Description of the Structure of a Vehicle

Figure 24:
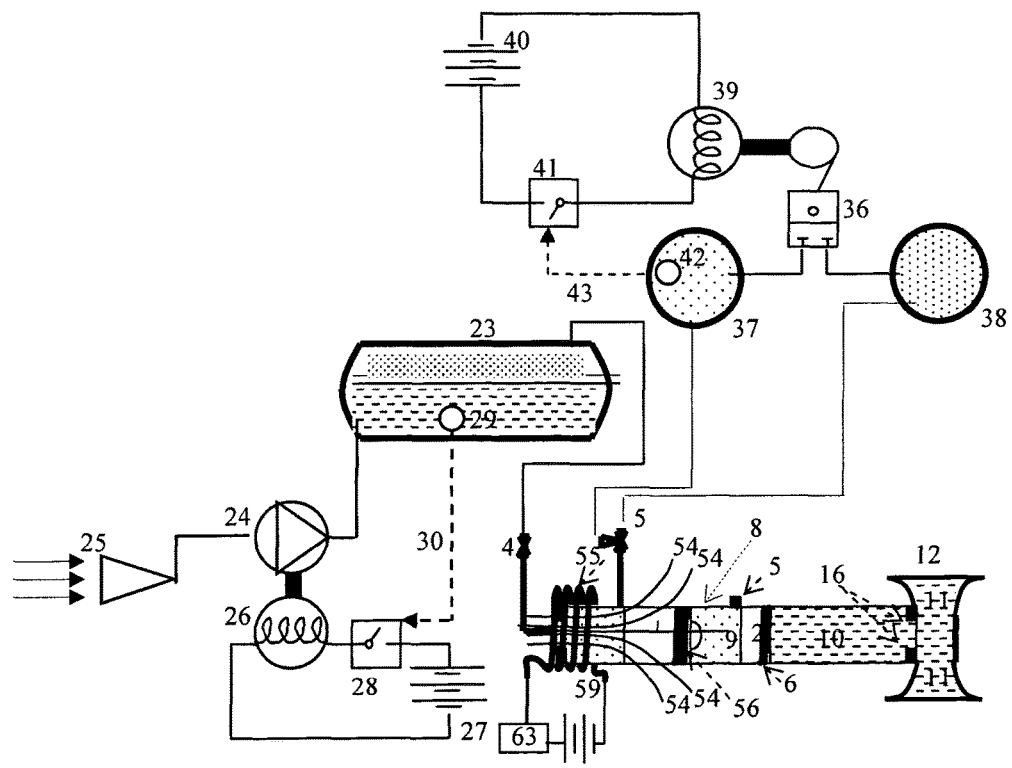
Figure 25:
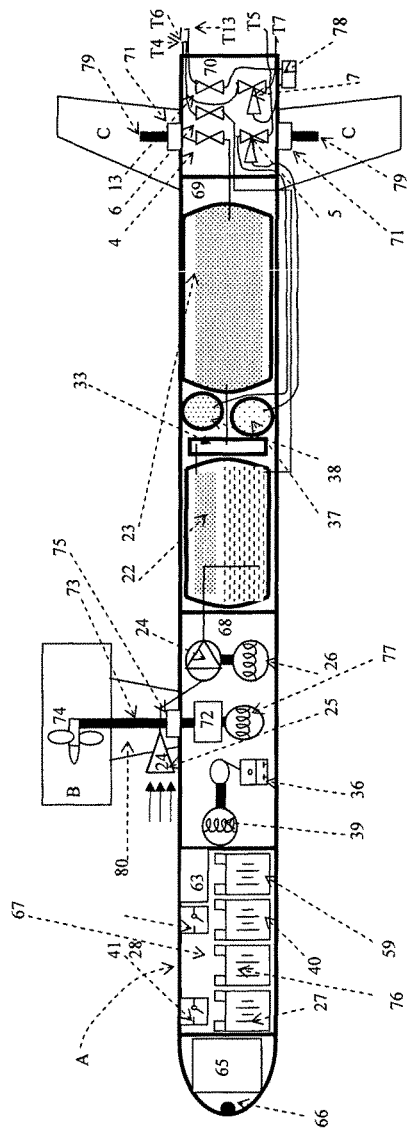

The system described above and in particular a single vehicle with its equipment onboard, the acoustic seismic sea source and devices for its actuation are illustrated, for example, in FIG. 25 which shows a longitudinal schematic cross-section of the power unit A of the vehicle in which there is also part of the plants described in FIG. 24. Five compartments can be distinguished: a compartment situated in the forward ogive containing the guiding and control system 65; a compartment 67 containing relay batteries and power controllers according the description of the legend; a compartment 68 which houses the machine room and in particular the pumps 24 and compressor 36 with relative motors, the electric motor 77 for activating the thrust and manoeuvring propellers 74, driven by means of the reducer 72 and transmission shaft 73, the pipe B of the propeller 74 being integral with the supporting fin 80 rotated through the actuator 75 to allow the thrust orientation of the propeller system and increase the manoeuvring capacity of the vehicle; the compartment 69 which houses the pressurization tanks for the pressurized gas and water supply to the acoustic emission pipe according to the above description and the nomenclature of the legend; a valve compartment 70 in which all the control valves of the technical fluids supplied to the emission pipe according to the above description are assembled and the nomenclature of the legend, all the terminal pipes leaving said compartment, which are directed to the unit D and in particular the terminal pipes T4, T5, T6, T7 and T13, compartment 70 also housing the servomotors 71 for activating the rudders C which rotate around the axes 79, and a water discharge valve 78 into the sea connected to the commutation means of the valves 7 and 13.

Figure 26:
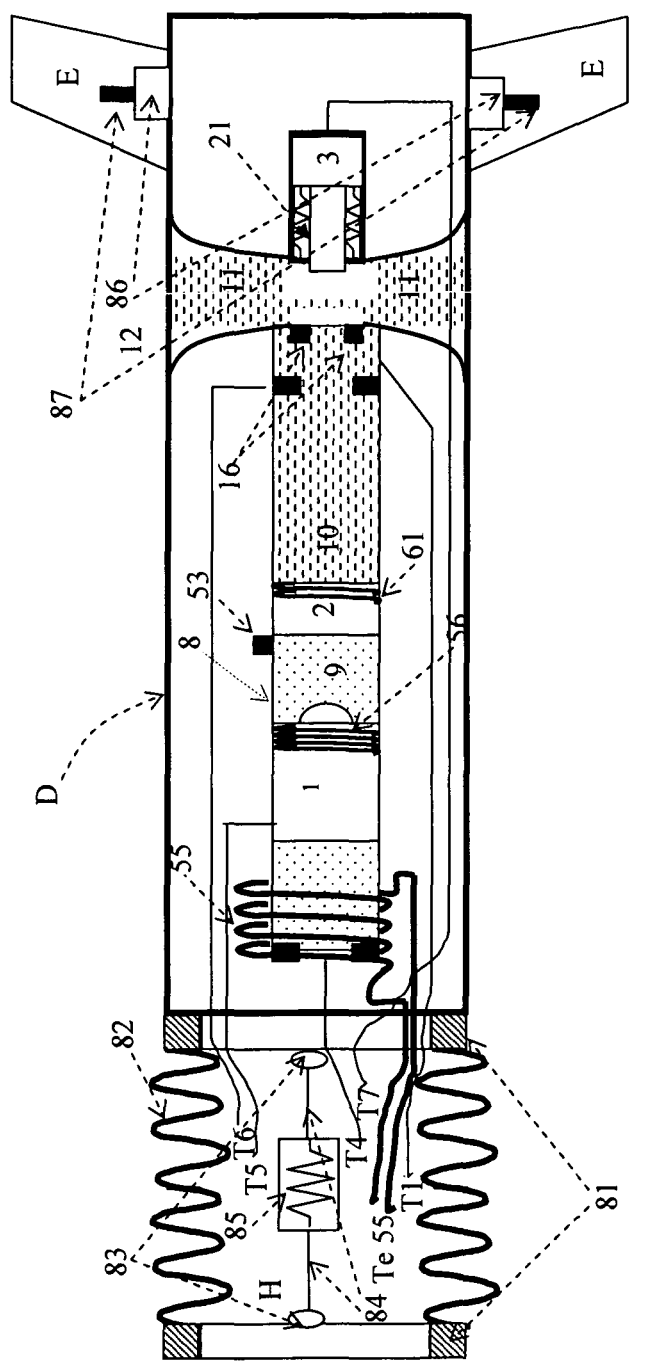

FIG. 26 illustrates a longitudinal cross-section of unit D of the vehicle, associated with unit A previously described, and the joint H, consisting of the connection flange 81, the entraining cables 84, the anti-jerk damper 85 interposed between these, the connections 83 between the cables 84 and flanges 81, and flexible corrugated casing 82. The terminals of the pressure ducts T4, T5, T6, T7 and T13 and the electric terminals Te55, are visible. The part D of the vehicle, on the other hand, houses an acoustic seismic sea source according to the previous descriptions and in particular an emission pipe in which the thrust forces of the striker piston are partly of the pneumatic type and partly of the electromagnetic type with solenoids and the repositioning device of the pistons is of the hydraulic type according to the previous descriptions. Finally, the rudders E rotate around the axes 87 activated by the servomotors 86.

Figure 27:
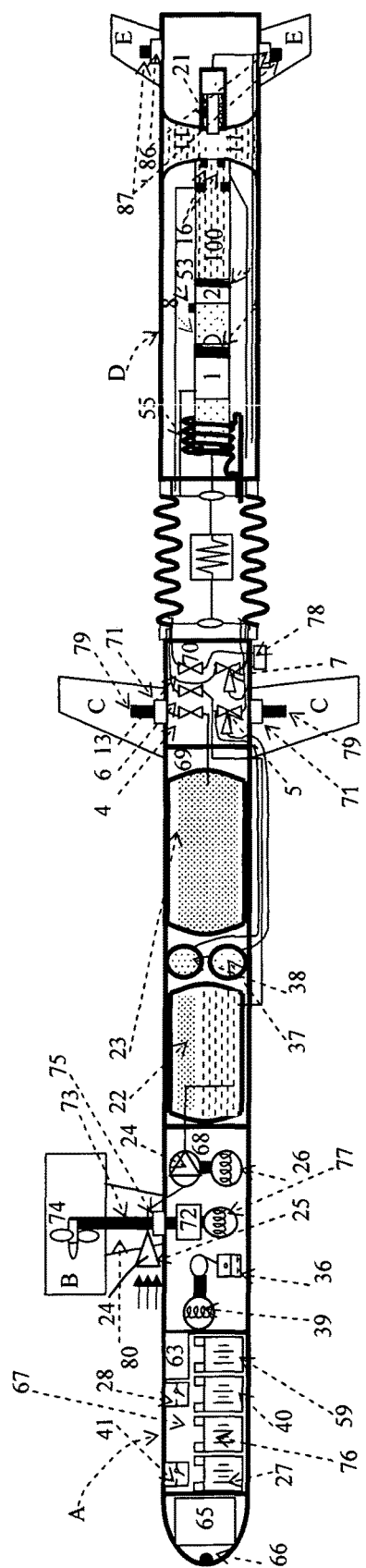

FIG. 27 represents the cross-section of the whole vehicle, units A and D described above connected by the joint H, in navigation configuration.

Figure 28:
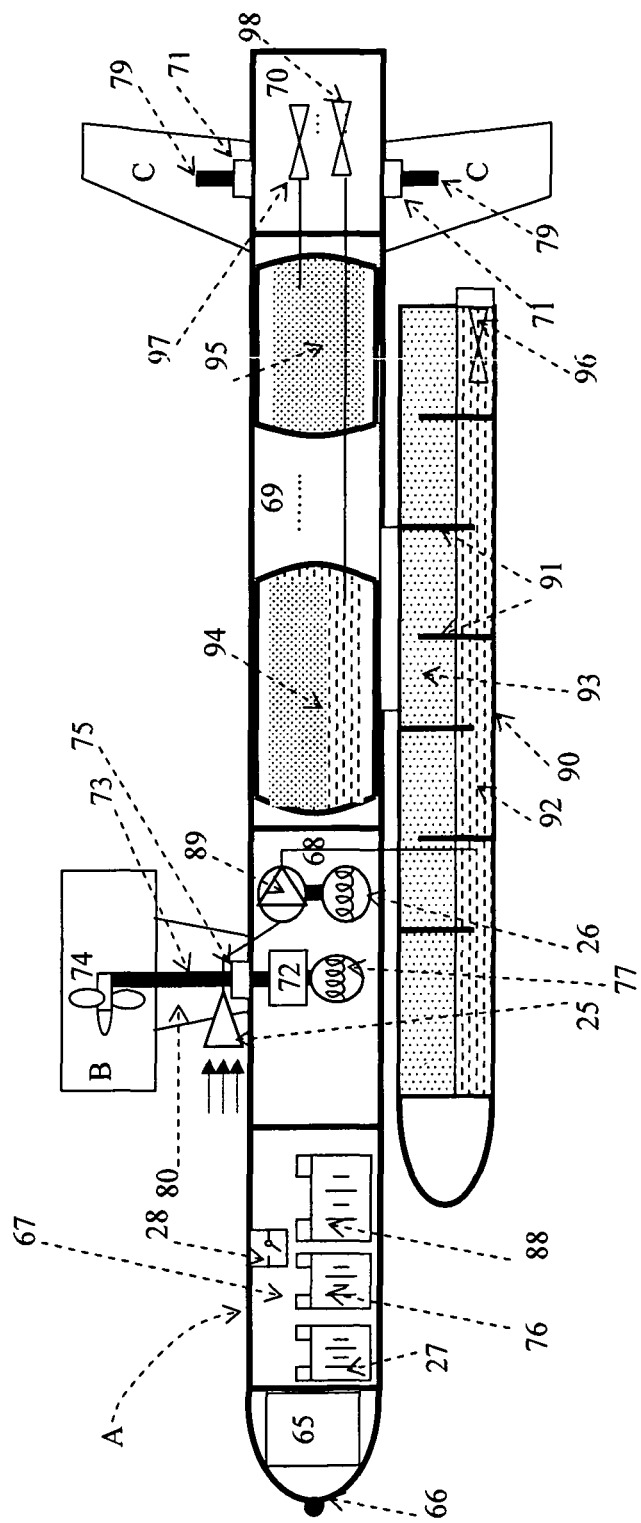

FIG. 28 represents the power unit A of a vehicle which is carrying a seismic source different from that specifically described above. In this case, the seismic source housed in the unit D of the vehicle is assumed to release into the water, technical fluids, for example air and/or water, supplied by various tanks housed in the compartment 69, for illustrative purposes two are represented, the first 94 and the last 95, whose distributions are controlled by the respective valves 97 and 98, only two are represented, the first and the last, housed in the compartment 70. The release of technical fluids into the water lightens the vehicle during the operation of the seismic source and consequently modifies the floating conditions of the vehicle during navigation. The tank 90 compensates the configuration by modifying the weight loaded with the action of the pumps 89, activated by the motor 26, which pump water from the sea environment, through the sea intake 25, into the tank 90, thus modifying the quantity of water 92 onboard and the floating conditions of the vehicle which is kept under neutral floating conditions. The tank 90 is equipped with dividing septa 91 for limiting the flotations of the liquid in the tank (sloshing) which could disturb the drivability and stability of the vehicle. The tank 90 contains pressurized gas 93 to allow the water to be emptied from the tank 90 through the controlled valve which allows the water to be discharged into the sea, said operation being effected simultaneously with the reloading of the technical fluids in the tanks housed in the compartment 69 in the stops at the surface station.

LEGEND OF THE GENERAL STRUCTURE OF THE SYSTEM

A Power Unit
B Propeller
C Configuration control surface
D Seismic source
E Configuration control surface
F Source diffuser
G Hauling cable system
H Rigid, elastic or loose joint
I Data transmission cable
IR Umbilical cable for connection with surface station
L Transmitters/receivers for onboard acoustic signals
M Antenna for onboard radio transmissions
N Transmitter/receiver of the service station
O Antenna for radio transmissions of the service station
P Inspection cavity
Q Tubular structure of the station
R Data memorization and processing system
S Transmitter/receiver of the service station, from/towards land station
T Antenna of the transmitter S
U Cable collector
V Ice layer
W, Y Tank for technical fluids
X Electricity generating group
Z Data transmission cable Seismic Source Legend:
1 Striker piston (for ex. 10 cm diameter)
2 Pump piston
3 Cut-off
4 High pressure air inlet valve (for ex. 200 bar)
5 Low pressure air inlet valve (for ex 2 bar) for repositioning piston 2, commutable on the vacuum tank for sucking air from thrust chamber (for ex. 0.1 bar)
6 High pressure water inlet valve (for ex. 205 bar)
7 High pressure air inlet valve (for ex. 200 bar)
8 Cylindrical pipe (for ex. overall length 2 m.)
9 Thrust pipe of the striker
10 Emission pipe
11 Diffuser
12 Sea environment (reference pressure, for ex. 2 bar)
13 Water outflow valve from the emission pipe 10 during the insertion of the cut-off 3 (discharge in sea environment at navigation level) commutable on high pressure water inlet
14 High pressure water inlet valve into the hydraulic thrust chamber 19 of the cut-off 3 (for ex. 200 bar)
15 Water outflow valve from the hydraulic thrust chamber 19 of the cut-off 3 (discharge into sea environment at navigation pressure)
16 Run-end stops of the pump piston 2 in the emission pipe 10
17 Pneumatic thrust chamber of the cut-off 3
18 Seat of the cut-off 3 in the emission pipe 10
19 Hydraulic thrust chamber of the cut-off 3
20 Run-end stops of the striker piston 1 in the thrust chamber 9
21 Retention springs of the cut-off (4-bis, 6-bis phases)
22 Thrust gas and pumping tank (for ex. 200 bar)
23 High pressure water accumulator tank (for ex. 205 bar)
24 High-prevalence pumping group
25 Sea intake water pumps
26 High power electric motor for activation pumping group 24
27 Motor 26 supply battery
28 Motor 26 activation relay
29 Pressure sensor
30 Relay control signal line
31 Pressure sensor
32 Relay control signal line
33 Gas drier equipped with gas reintegration valve in the tank 22
34 Control signal line of the valve drier 33
35 Relay control signal line
36 Low power volumetric compressor
37 Low pressure tank for emptying air from the thrust pipe 9
38 Overpressure tank for emptying water from the emission pipe 10
39 Low power electric motor for activation of the compressor 36
40 Motor 39 feed batteries
41 Relay for activation of motor 39
42 Pressure sensor
43 Relay 41 control signal line
44 Case-valve
45 Housing piston of the case 44
46 Gas passage spans
47 Rod 49 housing cylinder
48 Striker case
49 Valve rod
50 Truncated-conical head of the valve
51 Seat of the heat 50
52 Compressed gas adduction span 53 Disinsertable stop of the pump piston 2
54 Field lines generated by the coil 55
55 Induction coil integral with cylinder 8 (and with the thrust pipe 9)
56 Induced solenoid integral with the striker 1
57 Induction tracks
58 Conducting armature integral with the striker piston 1
59 Supply battery of coil 55
60 Balls/rolls of the bearing
61 Induced coil integral with the pump piston
62 Current controller of tracks 57
63 Current controller of coil 55
64 Supply battery of tracks 57
65 Guiding and control unit
66 Service union for recharging batteries, technical fluids, data unloading
67 Battery compartment, relay, power controllers
68 Machine room
69 Air/water pressurization tank compartment
70 Valve compartment
71 Electric/hydraulic servomotors for rudder activation
72 Reducer
73 Transmission shaft
74 Propulsion/manoeuvring propeller
75 Electric/hydraulic servomotors for rotation azimuthal propeller B
76 Battery for power supply to the propeller motor 77 and electronic installations onboard
77 Activation motor of propulsion/manoeuvring propeller 74
78 Sea discharge water from valves 7 and 13
79 Rudder axis
80 Supporting fin of propeller B
81 Connection flange of the joint H
82 Waterproof elastic corrugated casing
83 Haulage cable joint
84 Haulage cable
85 Anti-jerk damper
86 Electric/hydraulic servomotor for activation of rudder E
87 Rudder axis E
88 Propeller 77 feed batteries
89 Water pump of the compensation tank
90 Compensation tank
91 Anti-sloshing dividing septa
92 Compensation water
93 Pressurized air
94 Tank number 1—first of the battery—for the supply of technical fluids to the source D
95 Tank number N—last of the battery—for the supply of technical fluids to the source D
96 Water discharge valve from the compensation tank
97 Valve number 1 for the supply of technical fluids to the source D
98 Valve number N for the supply of technical fluids to the source D

The invention claimed is:

1. A system for generating pressure waves for deep seismic surveys in an underwater environment, comprising:
one or more autonomous underwater vehicles organized in swarms, the one or more autonomous underwater vehicles are configured to navigate both underwater and on a surface of the water, each of the one or more vehicles including onboard or entraining one or more seismic devices,
wherein the one or more seismic devices each include a cylinder defining an axis, the cylinder including therein a striker piston and a pump piston, each of the striker piston and the pump piston have two opposite sides with respect to the axis, one of the two sides for each piston being an impact side,
wherein the pistons are configured to slide along a direction parallel to said axis and configured to strike against each other in correspondence with the respective impact side of each piston, and
wherein the pump piston is in contact with water of a sea environment on the side opposite to the impact side such that a pressure wave generated by the impact of the striker piston and the pump piston propagates along the cylinder and is released into the sea environment,
wherein the pressure wave generated by the impact of the striker piston and the pump piston is released into the sea environment through at least one diffuser, and
wherein an axis of the at least one diffuser is oriented substantially perpendicular to the axis of the cylinder.

2. The system according to claim 1,
wherein the vehicles are equipped with an automatic navigation system, a data acquisition system onboard and reciprocal exchange means of information relating to positions, velocity, configuration, navigation data and synchronization of the acoustic emissions of the devices, and
wherein data flow and control signals are transmitted via cable and/or on an acoustic support and/or on an electromagnetic support.

3. The system according to claim 1 or 2 further comprising:
one or more surface stations for the supply of technical services to the vehicles, capable of being installed on ice and also floating on the surface and being moved on the surface during immersions of the underwater vehicles, said surface stations including a berthing for the vehicles for the supply of electric energy, gas and technical fluids, for control operations of the state of efficiency of devices and plants onboard the underwater vehicles and a telecommunication system,
wherein during navigation, the vehicles configured to be mechanically disconnected from the station or remain connected to it by means of an umbilical cable suitable for carrying communication cables and/or pipelines for technical fluids.

4. The system according to claim 1, wherein each vehicles carries onboard or entrains one or more devices.

5. The system according to claim 1, wherein a run length of the striker piston before impact with the pump piston can be regulated in order to modify the acoustic emission characteristics of the same device.

6. The system according to claim 1, further comprising a pressure generator of a gas for thrusting the striker piston against the pump piston.

7. The device according to claim 1, further comprising generation means of Lorentz electromagnetic forces for thrusting the striker piston towards the pump piston through magnetic fields generated by electric circuits integral with the cylinder and electric circuits integral with the pistons.

8. The system according to claim 1, wherein a diffuser is provided on each of a first side of the cylinder and on a second side of the cylinder opposite to the first side.

9. A method for generating pressure waves for deep seismic surveys in a sea environment, actuated by means of the system claimed in claim 1 or 2, wherein the seismic devices are activated according to a predefined scheme in order to increase energy introduced, minimizing resonance effects, reproducing an effect of a conventional air-gun array in terms of amplitude and frequency band of a signal itself.

10. A method for generating pressure waves for deep seismic surveys in a sea environment actuated by means of the device claimed in any one of claims 5, 6 and 7, the method comprising:

- thrusting the striker piston against the pump piston, by the pressure action of a gas;
- transmitting via the pump piston a pressure wave to the water of the sea environment by means of the side counteropposed to that against which the first piston strikes; and
- the striker piston continues its run integrally with the pump piston.

11. The method according to claim 10, wherein, after undergoing expansion following the run of the pistons, the gas is recompressed

- a) by means of the pressure energy accumulated in an accumulator tank containing a gas and a liquid, and wherein the energy is supplied by means of a system of pumps which inject liquid compressing the gas contained therein;
- b) by means of a retrograde movement of the two striker and pump pistons, which takes place along the cylinder in the opposite direction with respect to that relating to the expansion phase of the gas of the launch tank, the movement of the pump piston being generated by the pressure action of the liquid contained in the accumulator tank, in which the pressure is maintained at higher values with respect to that in force in the launch tank by means of the action of the pumps.

\* \* \* \* \*